(12) United States Patent
Brown

(10) Patent No.: US 6,578,763 B1
(45) Date of Patent: Jun. 17, 2003

(54) METHOD AND APPARATUS FOR VENDING A CONTAINERIZED LIQUID PRODUCT UTILIZING AN AUTOMATIC SELF-SERVICE REFILL SYSTEM

(75) Inventor: Laurie J. Brown, Shoreview, MN (US)

(73) Assignee: Restore Products, Shoreview, MN (US)

( * ) Notice: Subject to any disclaimer, the term of this patent is extended or adjusted under 35 U.S.C. 154(b) by 0 days.

(21) Appl. No.: 09/396,574

(22) Filed: Sep. 15, 1999

(51) Int. Cl.$^7$ .................................................. G06K 7/00
(52) U.S. Cl. ..................... 235/435; 235/381; 222/129.1
(58) Field of Search ................................ 235/435, 375, 235/381; 141/94, 231, 98, 192; 700/213, 239, 240, 241; 222/129.1, 129.2, 129.3, 129.4, 52, 63, 64

(56) References Cited

U.S. PATENT DOCUMENTS

| | | | |
|---|---|---|---|
| 2,718,630 A | * 9/1955 | Wait | 206/1.5 |
| 3,644,713 A | 2/1972 | Hayakawa et al. | |
| 3,688,085 A | 8/1972 | Tetar | |
| 4,285,426 A | * 8/1981 | Cahill | 194/4 |
| 4,558,212 A | * 12/1985 | Hampson | 235/383 |
| 4,563,739 A | 1/1986 | Gerpheide et al. | |
| 4,687,120 A | * 8/1987 | McMillin | 222/1 |
| 4,892,206 A | 1/1990 | Perrin | |
| 4,929,818 A | 5/1990 | Bradbury et al. | |
| 5,133,480 A | 7/1992 | Matsumoto et al. | |
| 5,257,741 A | * 11/1993 | Rode et al. | 241/24 |
| 5,291,004 A | 3/1994 | Frank et al. | |
| 5,392,827 A | * 2/1995 | Yasso et al. | 141/192 |
| 5,469,783 A | * 11/1995 | Frij | 100/49 |
| 5,566,732 A | 10/1996 | Nelson | |
| 5,612,525 A | 3/1997 | Apter et al. | |
| 5,699,162 A | 12/1997 | Pirani et al. | |
| 5,700,999 A | 12/1997 | Streicher et al. | |
| 5,729,002 A | 3/1998 | Samples | |
| 6,056,027 A | * 5/2000 | Patterson | 141/370 |
| 6,151,587 A | * 11/2000 | Mattias | 705/14 |

FOREIGN PATENT DOCUMENTS

JP      06-277231     * 10/1994

* cited by examiner

Primary Examiner—Diane I. Lee
(74) Attorney, Agent, or Firm—Roger W. Jensen

(57) ABSTRACT

A method and apparatus for vending a containerized liquid product to a vendee, after an original liquid container has been emptied, by successive refillings of the product and utilizing machine-readable indicia on the container, a discount ticket or coupon being dispensed to the vendee upon completion of the filling of the container.

10 Claims, 3 Drawing Sheets

METHOD AND APPARATUS FOR VENDING A CONTAINERIZED LIQUID PRODUCT UTILIZING AN AUTOMATIC SELF-SERVICE REFILL SYSTEM

BACKGROUND AND FIELD OF THE INVENTION

Commercial establishments, e.g., retailers such as supermarkets, etc., sell a wide variety of liquid products in various types of containers. A specific example of a liquid product is a liquid laundry detergent sold in relatively large plastic containers having a screw-type cap or closure. Vendees or customers, or consumers of such liquid products frequently discard the containers after using the contents thereof The discarded empty containers then migrate into a waste disposal area such as a landfill.

If an alternate system were used whereby the customer would bring back the empty original container to the commercial establishment for refilling the container using a user-friendly method (as will be described below in connection with the present invention), then the following benefits may be attained:

1. The commercial establishment can profitably vend or sell the liquid product for the refilling at a price significantly lower than the original sales price; such lower price will financially motivate the customer to return the empty container for refilling. The commercial establishment will use relatively low cost bulk quantities of the liquid product for the refilling; this will facilitate a strong profit margin for the commercial establishment.
2. The refilling and reuse of the containers breaks the cycle of "use and discard", i.e., keeps empty containers out of the landfills with the obvious benefit to society.

Thus the present invention provides financial benefits to both the commercial establishment/vendor and the consumer/vendee while also facilitating a reduction in solid waste as a benefit to society.

DESCRIPTION OF PRIOR ART

U.S. Pat. No. 4,929,818 to Bradbury, et al., discloses a method and apparatus for vending a containerized product on multiple occasions. A customer initially purchases a fluid-filled container with a bar code that indicates the price of the container and fluid. Upon emptying the container, the customer returns to the store and refills the container at a refill station. The refill station modifies the bar code on the container to indicate that the container has been refilled. Thus, when the customer checks out, he or she is only charged for the refill, and not the container. A major disadvantage of the system disclosed in U.S. Pat. No. 4,929,818 is that it requires a relatively complex apparatus for modifying the bar code on the container to indicate that the container has been refilled. This complexity has been avoided by my invention.

SUMMARY OF THE INVENTION

In broad terms, the present invention provides a method of vending a containerized liquid product to a vendee utilizing an original container for said liquid product. Parenthetically, at the time of the original purchase of the original container of the liquid product, the container had thereon a machine-readable indicia such as a bar code or the like indicative of the liquid product and of the original sales price of the container as filled with the liquid product. After the original container had been emptied of the liquid product, then the invention provides for multiple refillings of the liquid product into the original container. The machine-readable indicia on the container is utilized to actuate the refilling of the container and, after each refilling of the container, the method dispenses to the refill vendee a discount coupon to be presented to the vendor's check-out station, together with the refilled container, whereby the price charged to the vendee by the vendor is the original sales price, less the value of the discount coupon.

Another important aspect of my invention is that the basic concept can be expanded to provide for the vending of a plurality of containerized liquid products respectively into a plurality of original refillable containers from a single dispensing station. For this case, each of the plurality of liquid products having been originally vended in an original refillable container (which may be of different diameters) having a unique machine-readable indicia thereon indicative of the liquid product in said original refillable container, and the original sales price thereof prior to the first refilling thereof For each refilling of a selected refillable container with the matching liquid product, then a discount coupon is dispensed to the refill vendee which then may be present to the vendors customer checkout station, together with the matching refilled container.

Another important aspect of my invention is that the liquid refilling method includes a vertically oriented liquid filling pipe or probe having an outlet and being positioned over a filling opening in an original container, and further being adapted to be vertically moveable with respect to the original container and being sized to freely enter the filling opening. The filling pipe or probe is inserted into the refillable container through the opening until the outlet is adjacent the bottom of the refillable container, following which the container is filled with a preselected volume of the liquid product. This is an important feature because it tends to prevent any foaming of the liquid as it is being transferred into the container.

Another aspect of my invention is to provide an additional marketing function to the method in connection either with the single product or multiple product versions discussed above by dispensing to the refill vendee, at the time of dispensing said discount coupon, at least one additional coupon or marketing message.

Another advantage of the present invention is that it can be linked to an inventory control management system whereby data is collected on the volume, on a product-by-product basis, of sales of the liquid products to thereby permit either the supplier to automatically restock the product or products at the appropriate time, and/or the retailer to automatically order from the supplier at the appropriate time.

DETAILED DESCRIPTION OF THE INVENTION

Figure 1:
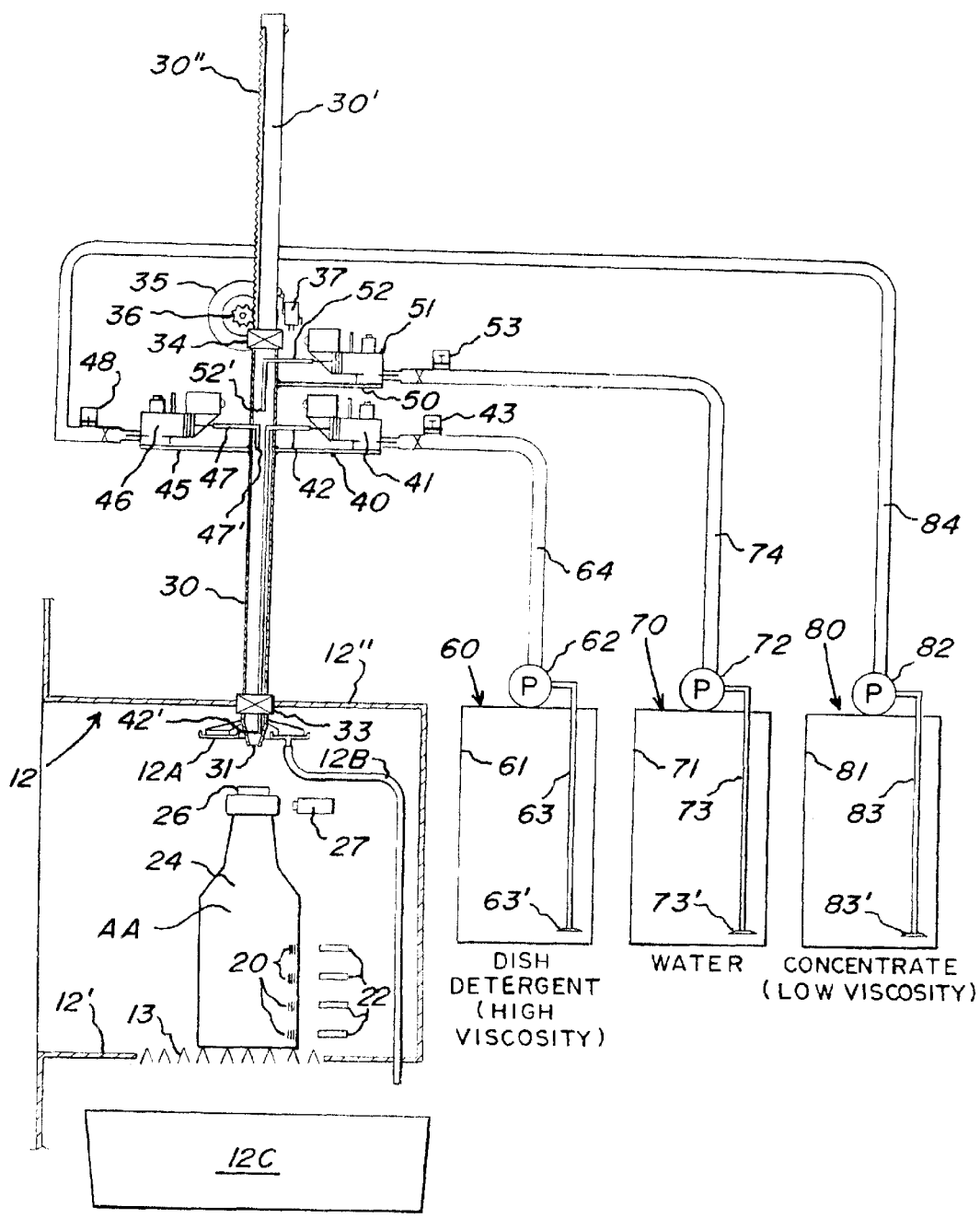
FIG. 1 is a schematic representation of a refill station.
Figure 2:
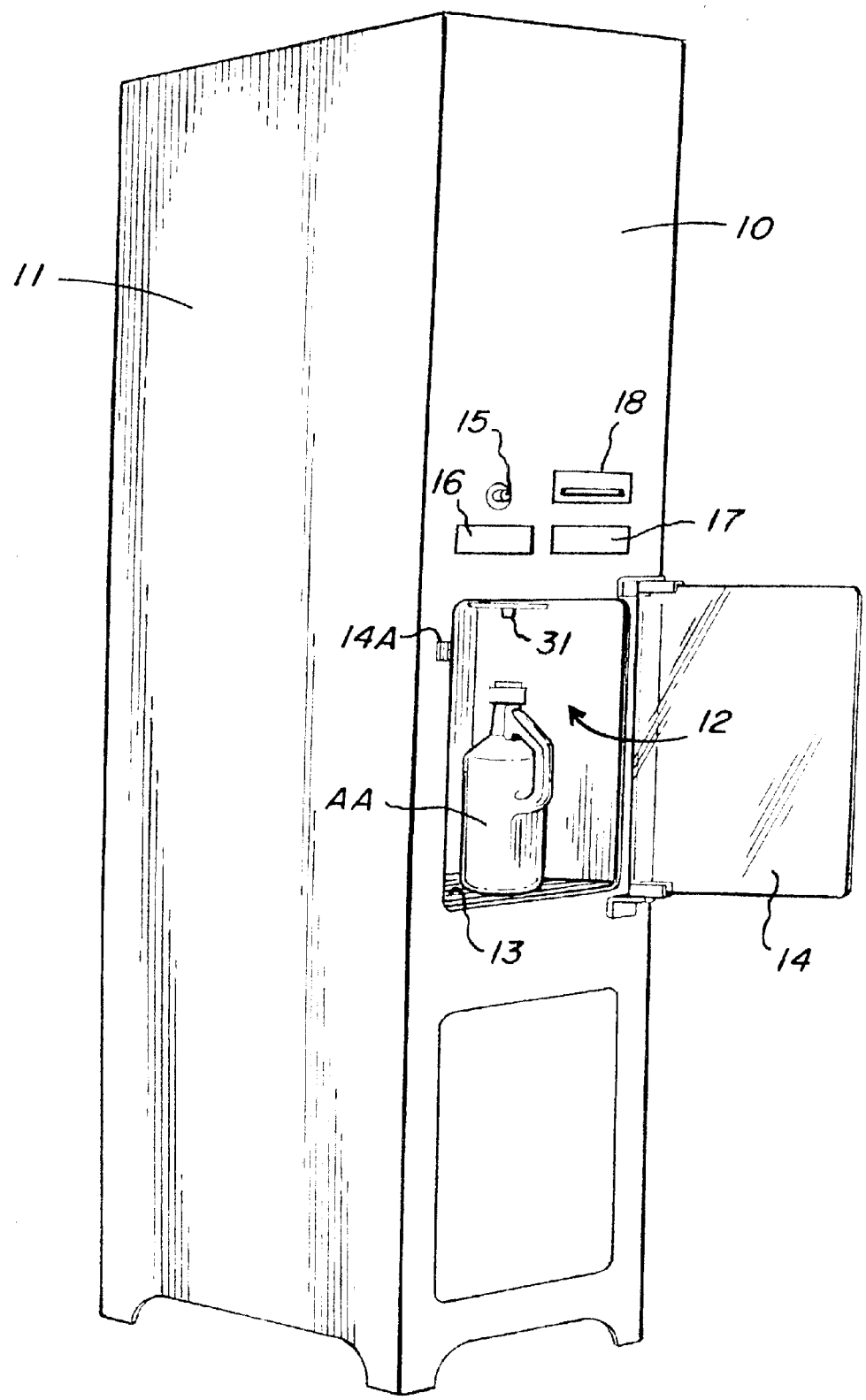
FIG. 2 is a perspective view of a refill station cabinet.

FIGS. 1 and 2 depict a method and system of vending a single proprietary cleaning product, i.e., a self-service bottle filler designed to reduce cost and waste by reusing the consumer's bottle. It should be understood that the concept is applicable for the vending of two or more different proprietary liquid products. Thus, for one vending scenario, the consumer purchases one of ten different proprietary cleaning products. When the bottle is empty, the consumer brings it to a store when then has an automatic bottle refiller. The bottle is inserted in a chamber and the device reads the code on the label to identify the type and quantity of cleaner. The system then blends and dispenses the same product that is identified on the label. For this scenario, the products consist of one of five different concentrates dispensed selectively in full concentration or mixed with varying quantities of filtered water. The bottles preferably are of durable translucent plastic with removable tops. The shape of the bottles is selected so as to facilitate proper centering and orientation within the device's fill chamber. Additional considerations are that the label carrying the code or indicia must be durable, colorfast, and positioned correctly and consistently toward the code reader. The footprint and diameter of varying capacity bottles must be the same so as to facilitate centering under the fill-spout. The mouth of the container must be sufficiently wide for ease of receiving the filling probe.

Referring to FIG. 2, a refilling cabinet is depicted as a floor-supported device having a front panel 10 and a side panel 11. A fill chamber 12 extends inwardly from a midsection of the front panel 10 and has a perforated bottom or drain shelf 13 for receiving and supporting an empty bottle or container AA. A suitable door 14 is provided for closing off the chamber 12. A door latch and interlock 14A on front panel 10 holds or retains door 14 and also is an element of the filling control circuit. A start button 15, discount coupon dispensing means 18 and visual message means 16 and 17 are also provided on the front panel 10 of the cabinet adjacent to the start button 15 and positioned above the chamber 12.

Referring to FIG. 1, the chamber 12 is depicted as having a lower surface 12' with its integral perforated section 13 and an upper or top surface 12". The empty container AA is depicted positioned resting on surface 13 with a neck-down portion terminating in an opening 26 at the top thereof. An overfill sensor 27 is fixed to chamber 12 and is positioned adjacent the top 26 of container AA.

The container AA has machine-readable indicia 20 thereon, selected in accordance with technology well known to those skilled in the art. For the example depicted, there are four separate indicia marks 20 which are adapted to be sensed by four sensors 22 attached to the chamber 12 for the purpose of identifying the type and quantity of the liquid product originally vended in container AA.

Figure 4:
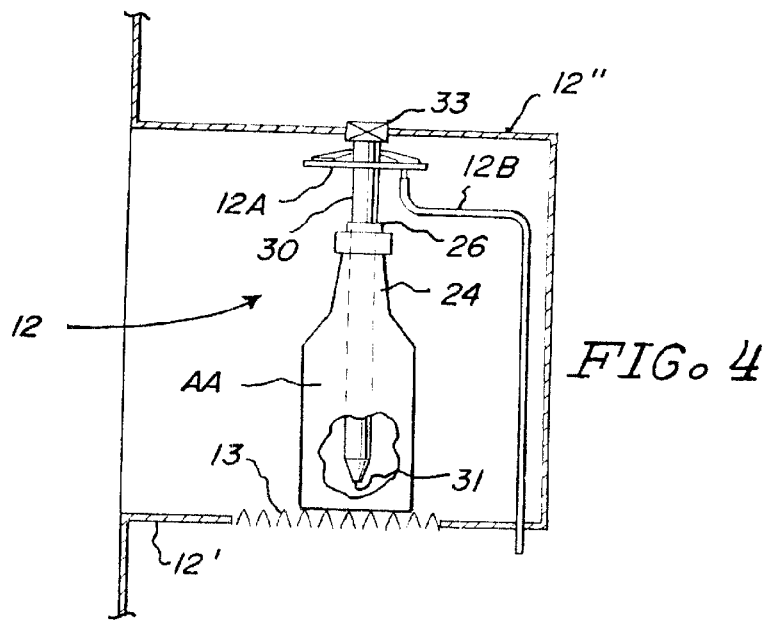
FIG. 4 is a partial view of the apparatus of FIG. 1, with the filling pipe or probe 30 moved down and into the container AA.

A fill-probe 30 is vertically positioned above the container AA and is adapted to be moved vertically from the position shown in FIG. 1 to the position shown in FIG. 4, i.e., with the spout of discharge end 31 of the probe (shown in FIG. 4) adjacent to the bottom of container AA. Thus, fill-probe 30 has an outside diameter preselected so as to permit insertion of the probe through the top opening 26 of container AA and thence downwardly into the container. This arrangement facilitates the refilling of the container AA with a minimum of foaming.

The fill-probe 30 is supported for the aforesaid vertical movement with respect to container AA by a pair of guide-bushings 33 and 34 shown in FIG. 1. The top (as shown in FIG. 1) portion of fill-probe 30 is identified by reference numeral 30' and has a longitudinally extending rack-gear 30" which is adapted to be engaged by a pinion gear 36 driven by a motor-slip-clutch means 35. Thus, when motor-slip-clutch 35 is energized in one sense it will cause the rotation of pinion gear 36 so as to drive the rack-gear 30" and thus the fill-probe 30 downwardly as shown in FIG. 1 to the position shown in FIG. 4. A reverse energization of motor-slip-clutch 35 will retract the fill-probe to the position shown in FIG. 1.

Rigidly attached to the fill-probe 30 are brackets 40, 45, and 50, on which are mounted suitable valve and flow control means 41, 51 and 46 respectively. Each of the units 41, 51 and 46 have a discharge conduit extending inside of the fill-probe 30. Thus, valve and flow control 41 has a conduit 42 extending into fill-probe and extending down to a discharge opening 42' adjacent the nozzle 31 of the fill-probe 30. In the same manner, units 46 and 51 have conduits 47 and 52, terminating respectively in discharge ports 47' and 52' within the fill-probe 30.

Flexible fluid lines 64, 74 and 84 are connected respectively to inlet means of the valve and flow control units 41, 51 and 46. Suitable pressure switches 43, 53 and 48 are connected to the flexible fluid lines 64, 74 and 84 respectively. The flexible fluid lines 64, 74 and 84 are respectively connected to the output of suitable pumps 62, 72 and 82 respectively, which are associated with bulk liquid containers 60, 70 and 80 respectively. The arrangement depicted in FIG. 1 is for a typical scenario where container 61 contains a dish-detergent having a high viscosity; container 71 contains filtered water, and container 81 contains a low-viscosity concentrate. Pump 62 has an inlet conduit 63 extending to the lower portion of container 61; the bottom of conduit 63 is identified by reference numeral 63'. Likewise, pump 72 has a conduit 73 with a lower end 73', and pump 62 has a conduit 83 with a lower end 83' extending to near the bottom of containers 71 and 81 respectively.

Within the chamber 12 is a collector 12A concentrically positioned about the lower end 31 of the fill-probe 30 and functions to collect any errant fluid that might be on the outer surface of fill-probe 30, such errant fluid then would be collected and removed via a suitable tube 12B, adapted to discharge into a drain pan 12C.

When container AA is filled to the proper level (as sensed by overfill sensor 27), then the control system functions to stop the pumps, to retract the fill probe, and to dispense at least one discount coupon at 18 for the vendee. In some cases, for marketing reasons as an example, the machine may dispense, in addition to the discount coupon, another coupon relating to another product.

Figure 5:
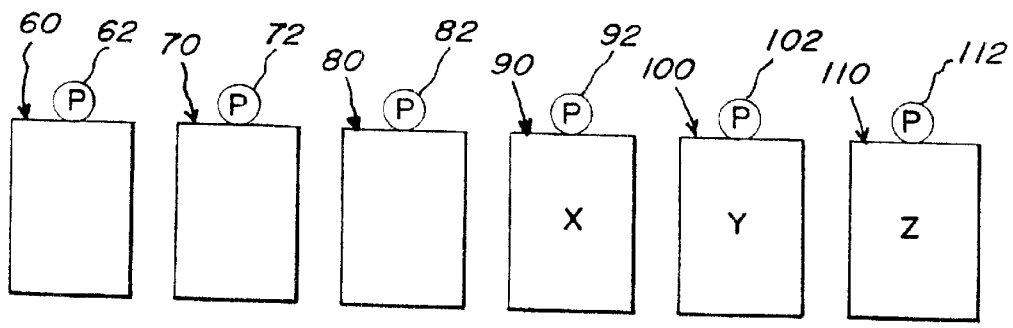
FIG. 5 is a view showing a total of six liquid storage containers for use, in one embodiment, with the apparatus of FIG. 1.

As indicated, the scenario depicted in FIG. 1 is for a single proprietary-cleaning product. FIG. 5 depicts an expansion of the arrangement shown in FIG. 1 where only the bulk storage containers 60, 70 and 80 have been depicted but, in addition are three additional bulk storage containers 90, 100 and 110, containing, respectively, proprietary products X, Y and Z. The containers 90, 100 and 110 comprise in part, respectively, pump means 92, 102 and 112. It will be understood that pumps 92, 102 and 112 each would be connected to probe 30 through flexible fluid lines, valve and flow control units, and discharge conduits within the fill-probe 30 similar to those items associated with pumps 62, 72 and 82.

Thus, in operation, the sensors 22 will respond to the indicia 20 on the container AA; this determines the type and quantity of cleaner for that specific container. Then the control means will selectively actuate the appropriate pumps and valve and flow control means. For the scenario depicted in FIG. 1 the pumps 62, 72 and 82 are actuated, as are their respective valve and flow controls 41, 51 and 46. The valve and flow controls means are controlled so as to provide the proper blending of the three liquids being pumped through the flexible fluid lines 64, 74 and 84 into the fill-probe 30 and thence into the container AA.

For a different proprietary product, e.g., X, then the system control would cease utilizing liquid from tank 61, and commence using product from tank 90.

It will also be understood that the invention, shown in FIG. 2 as floor supported, may be configured for a support located above a floor.

Figure 3:
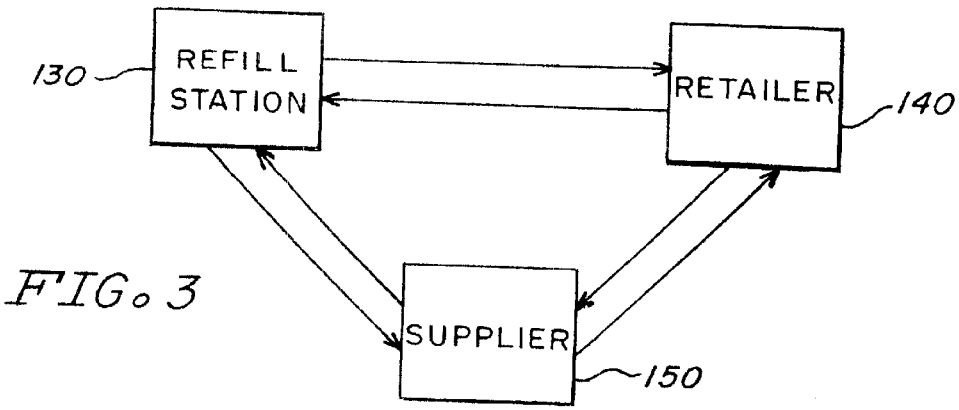
FIG. 3 is a block diagram of an inventory control system.

Another aspect of the invention is schematically shown in FIG. 3 wherein information generated at the refill station 130 concerning the quantity of bulk liquids utilized is made available both to the retailer 140 and to the bulk supplier 150. This information can be very useful and cost effective for purposes of inventory control. In one mode, the supplier 150 of bulk liquid products may receive the information from the refill station 130 and, pursuant to prior agreement, automatically maintain adequate fluid supplies at the refill station. Alternately, the retailer 140 may maintain control over the ordering of supplies by receiving the information from the refill station and then, as appropriate, order from the supplier 150 additional stock for the system.

While the preferred embodiment of the invention has been illustrated, it will be understood that variations may be made by those skilled in the art without departing from the inventive concept. Accordingly, the invention is to be limited only by the scope of the following claims.

What is claimed is:

1. The method of vending a containerized liquid product to a vendee utilizing an original container for said liquid product and, after said original container has been emptied of said liquid product, then vending multiple refillings of said liquid product in said original container, said container having machine-readable indicia thereon indicative of said liquid product and the original sales price of said container as filled with said liquid product prior to the first refilling thereof, and, for each refilling of said container, dispensing to the refill vendee a discount coupon to be presented to the vendor's checkout together with the refilled container whereby the price charged to said vendee for said refilled container equals said original sales price less the value of said discount coupon.

2. The method of claim 1 further characterized by selectively vending a plurality of containerized liquid products respectively into a plurality of original refillable containers from a single dispensing station, each of said plurality of liquid products having been originally vended in an original refillable container having machine-readable indicia thereon indicative of the liquid product in said original refillable container and the original sales price thereof prior to the first refilling thereof, and, for each refilling of a selected original refillable container with the matching liquid product, dispensing to the refill vendee a discount coupon which may be presented to the vendor's customer checkout together with the matching refilled container.

3. The method of claim 1 further characterized by utilizing refilling apparatus comprising, in part, a vertically oriented liquid filling pipe having an outlet, being positioned over a filling opening in said original container, and connected to a supply of said liquid product, said filling pipe being vertically movable with respect to said original container and being sized to freely enter said filling opening, said filling pipe being inserted into said container through said opening until said outlet is adjacent the bottom of said container following which said container is filled with a preselected volume of said liquid product.

4. The method of claim 1 further characterized by dispensing to said refill vendee, at the time of dispensing said discount coupon, at least one additional coupon.

5. The method of claim 1 further characterized by providing to said refill vendee, at the time of the dispensing of said discount coupon, a graphic display of information.

6. The method of claim 1 further characterized by the liquid product refilled into said container being blended from the liquid stored in at least two containers.

7. The method of claim 3 wherein said filling pipe is connected to at least two supplies of liquid which are blended in said filling pipe to form said liquid product.

8. Apparatus for vending a containerized liquid product to a vendee utilizing an original container for said liquid product and, after said original container has been emptied of said liquid product, then vending multiple refillings of said liquid product in said original container, said container having machine-readable indicia thereon indicative of said liquid product and the original sales price of said container as filled with said liquid product prior to the first refilling thereof, and for each refilling of said container, dispensing to the refill vendee a discount coupon to be presented to the vendor's check-out, together with the refilled container, whereby the price charged to said vendee for said refilled container equals said original sales price less the value of said discount coupon, said apparatus comprising:

a) a vertically-oriented liquid filling pipe having a discharge port at the bottom thereof and positioned over and in register with a filling opening in said original container, said container being positioned within a chamber with said machine-readable indicia oriented to be in register with indicia reading means;

b) at least one bulk supply of liquid, and means controlled by said indicia reading means for initiating the transfer of fluid from said bulk supply of fluid to said liquid filling pipe and thence to said container; and c) means for sensing the complete filling of said container and for terminating said transfer of fluid, and for dispensing a discount coupon.

9. Apparatus of claim 8 further characterized by including a door means for closing off said chamber and interlock means actuated by said door means, and means connecting said indicia reading means and said interlock means for controlling the transfer of fluid from said bulk supply of fluid to said container.

10. Apparatus of claim 8 wherein said vertically-oriented liquid filling pipe has a rack-gear attached thereto and engaged with a reversible pinion gear, said pinion gear being selectively operated by a motor, and said motor being controlled by said indicia-reading means.

* * * * *